US 6,731,581 B2

(12) United States Patent
Huang (10) Patent No.: US 6,731,581 B2
(45) Date of Patent: May 4, 2004

(54) ROTATING DEVICE FOR A DISC DRIVE COVER

(75) Inventor: Hui-Chu Huang, Taipei (TW)

(73) Assignee: Lite-On IT Corporation, Taipei (TW)

( * ) Notice: Subject to any disclaimer, the term of this patent is extended or adjusted under 35 U.S.C. 154(b) by 250 days.

(21) Appl. No.: 10/105,820

(22) Filed: Mar. 25, 2002

(65) Prior Publication Data

US 2003/0063548 A1 Apr. 3, 2003

(30) Foreign Application Priority Data

Sep. 28, 2001 (TW) ........................................ 90216632 U (51) Int. Cl.⁷ .............................................. G11B 33/02
(52) U.S. Cl. ...................................................... 369/75.1
(58) Field of Search ...................... 369/75.1; 360/97.01; 361/679, 685, 724

(56) References Cited

U.S. PATENT DOCUMENTS

| | | | | |
|---|---|---|---|---|
| 5,265,083 A | * | 11/1993 | Ishii et al. ................... | 369/75.2 |
| 5,610,891 A | * | 3/1997 | Choi ............................ | 369/77.2 |
| 5,654,846 A | * | 8/1997 | Wicks et al. ............... | 360/97.01 |
| 5,768,237 A | * | 6/1998 | Kanada et al. .............. | 369/75.1 |
| 5,870,367 A | * | 2/1999 | Yamamori ................... | 369/75.1 |
| 6,128,265 A | * | 10/2000 | Leung ......................... | 369/75.1 |
| 6,385,154 B1 | * | 5/2002 | Kokubo et al. ............. | 369/75.1 |
| 6,407,971 B1 | * | 6/2002 | Kojima ....................... | 369/75.1 |
| 6,657,940 B1 | * | 12/2003 | Takeda et al. .............. | 369/75.1 |

FOREIGN PATENT DOCUMENTS

| | | | |
|---|---|---|---|
| JP | 59-72672 | * | 4/1984 |
| JP | 63-106982 | * | 5/1988 |
| JP | 7-169255 | * | 7/1995 |
| JP | 10-227174 | * | 8/1998 |

* cited by examiner

*Primary Examiner*—David Ometz
(74) *Attorney, Agent, or Firm*—Thomas, Kayden, Horstemeyer & Risley (57) ABSTRACT

A rotating device for a cover connected to a housing of a disc drive. The rotating device includes a spring-loaded outer sleeve, a spring-loaded inner sleeve, a spring and a fixing place. The spring-loaded outer sleeve, having a first closed end and a first open end, is fixed to the cover and filled with damping material. The spring-loaded inner sleeve with the spring within has a second closed end with a key and a second open end inserted into the first open end of the spring-loaded outer sleeve. The fixing place is fixed to the housing of disc drive and includes an upper L-shaped member with an upper slot, a lower L-shaped member with a lower slot and a first end portion with a hollow to pivot the first closed end of the spring-loaded outer sleeve. The lower L-shaped member is bolted to the upper L-shaped member, and the upper slot and the lower slot are used to mesh the key of the spring-loaded inner sleeve.

7 Claims, 8 Drawing Sheets

ROTATING DEVICE FOR A DISC DRIVE COVER

BACKGROUND OF THE INVENTION

1. Field of the Invention

The present invention relates to a rotating device for a disc drive cover, more particularly, to a rotating device with material for damping the opening speed of the cover connected to the housing of a disc drive.

2. Description of the Related Art

In general, disc drives with an independent housing are called external disc drives, and transmit data and sound signals to computers and earphones by cables.

Figure 1:
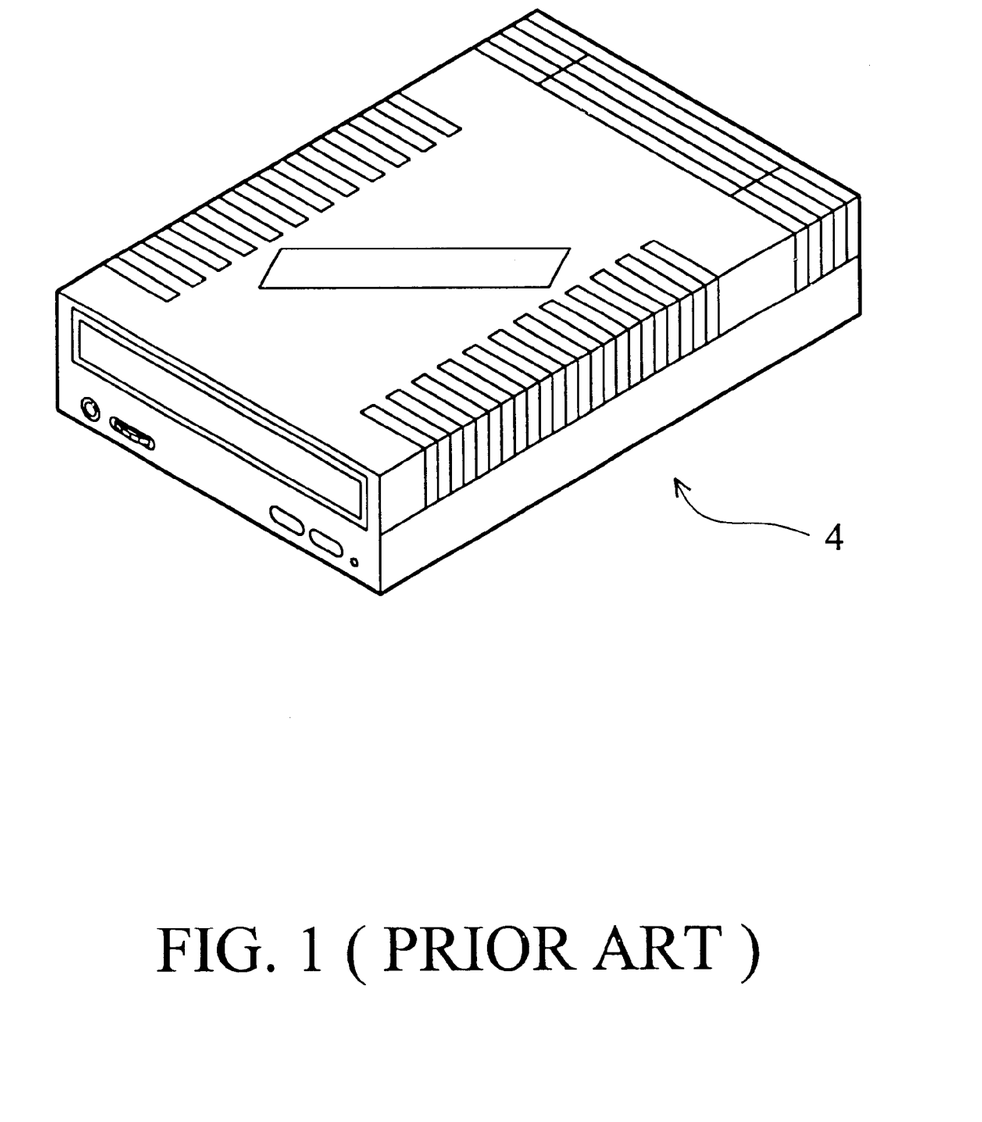
FIG. 1 (Prior Art) is a 3-D diagram of a sliding tray disc drive.

To read the data saved on different discs, disc drives need mechanisms to exchange discs. Previously, mechanisms used by external disc drives to exchange discs have included sliding tray and opening cover mechanisms. FIG. 1 is a 3D diagram of a sliding tray disc drive. In FIG. 1, the housing of the sliding tray disc drive (4) has a square slot for a disc carrier to move out horizontally, but the disc carrier easily locks. The opening cover mechanism is another choice, but this kind of mechanism is more complicated and expensive.

SUMMARY OF THE INVENTION

Therefore, the object of the present invention is to provide a rotating device with simple structure to connect a cover to the housing of a disc drive.

To achieve the aforementioned object, the rotating device of the present invention includes a spring-loaded outer sleeve, a spring-loaded inner sleeve, a spring and a fixing place. The spring-loaded outer sleeve having a first closed end and a first open end is fixed to the cover and filled with damping material. The spring-loaded inner sleeve with the spring within has a second closed end with a key and a second open end inserted into the first open end of the spring-loaded outer sleeve. The fixing place is fixed to the housing of the disc drive and includes an upper L-shaped member with an upper slot, a lower L-shaped member with a lower slot and a first end portion with a hollow to pivot the first closed end of the spring-loaded outer sleeve. The lower L-shaped member is bolted to the upper L-shaped member, and the upper slot and the lower slot are used to mesh the key of the spring-loaded inner sleeve.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE PREFERRED EMBODIMENTS

In the present invention, a rotating device of a opening cover disc drive is shown in FIG. 2 to FIG. 5. The structures of the disc drive include a cover (1), a first housing (2) and a second housing (3). The first housing (2) and the second housing (3) form the main body of the disc drive. The cover (1) has an inner face (14) and a V-shaped member (10) extending from the periphery of the inner face (14). At the end of the V-shaped member (10) has a spring-loaded outer sleeve (11) with a first closed end (111) and a first open end (112). A spring-loaded inner sleeve (12) has a second open end (122) and a second closed end (121) with a key (124). When fabricating the cover (1), a spring (13) is inserted into the spring-loaded inner sleeve (12) first. The second open end (122) of the spring-loaded inner sleeve (12) is inserted into the first open end (112) of the spring-loaded outer sleeve (11). The spring-loaded outer sleeve (11) and spring-loaded inner sleeve (12) also have grooves (113), (123) (shown in FIG. 5) to fix the spring (13). When screwing the spring-loaded inner sleeve (12), the spring (13) provides the elastic force to open the cover (1). The magnitude of the elastic force is determined by how tightly the spring-loaded inner sleeve (12) is wound. To avoid breaking the spring-loaded outer sleeve (11), there is filled with damping oil or gas within the tiny space between the spring-loaded outer sleeve (11) and the spring-loaded inner sleeve (12) to damp the opening speed of the cover (1).

Figure 2:
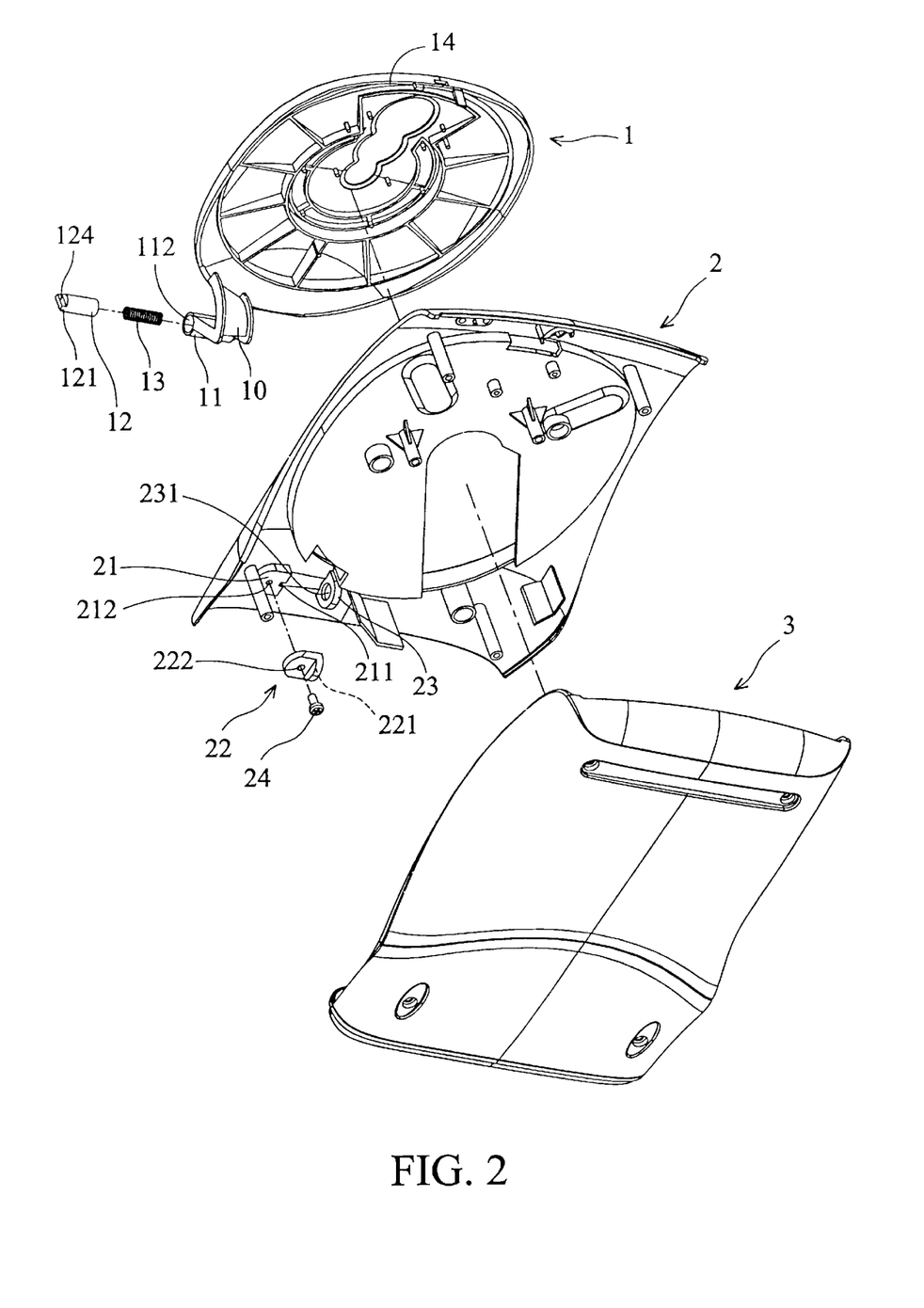
FIG. 2 is an exploded perspective diagram of the opening cover disc drive.
Figure 3:
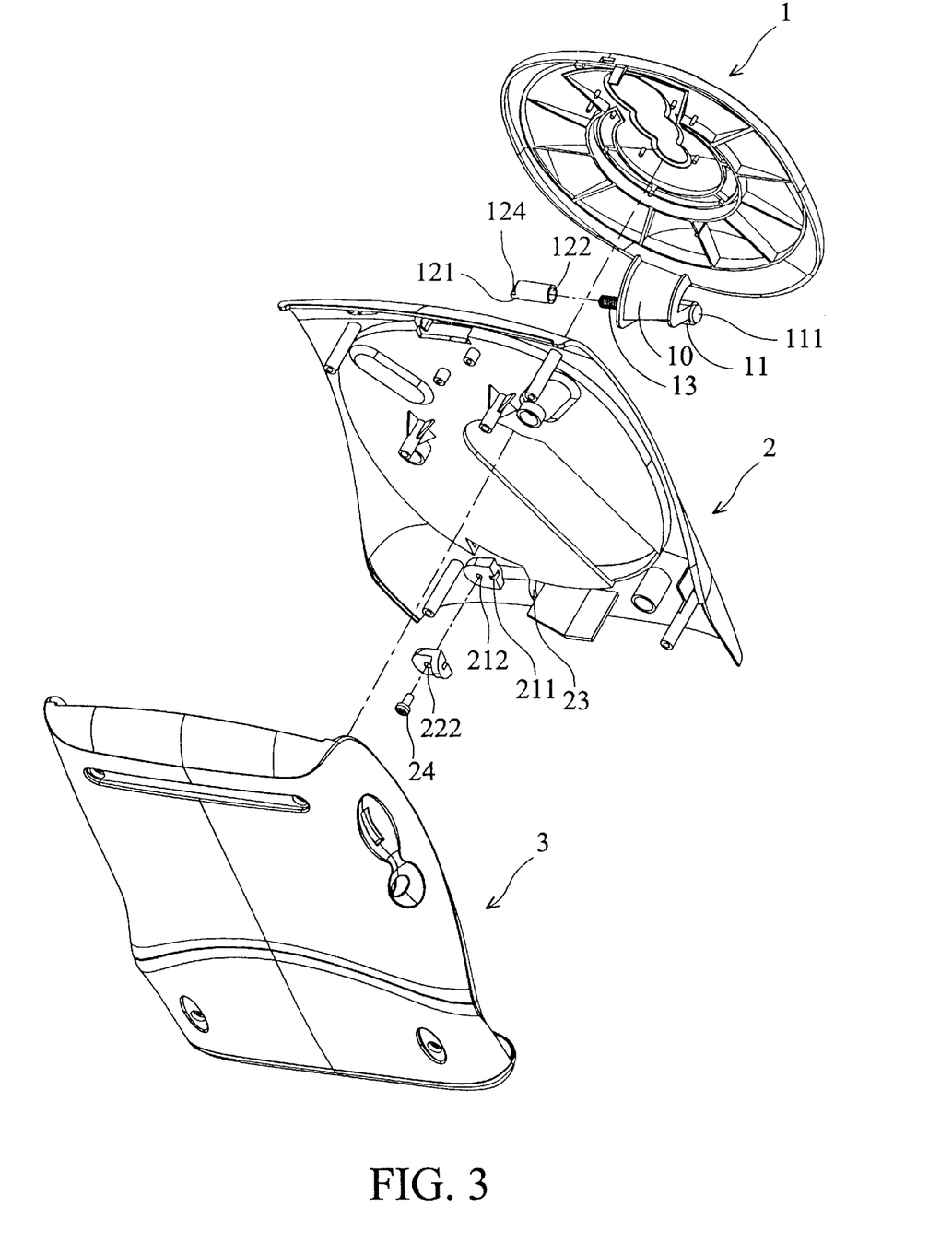
FIG. 3 is another exploded perspective diagram of the opening cover disc drive.
Figure 4:
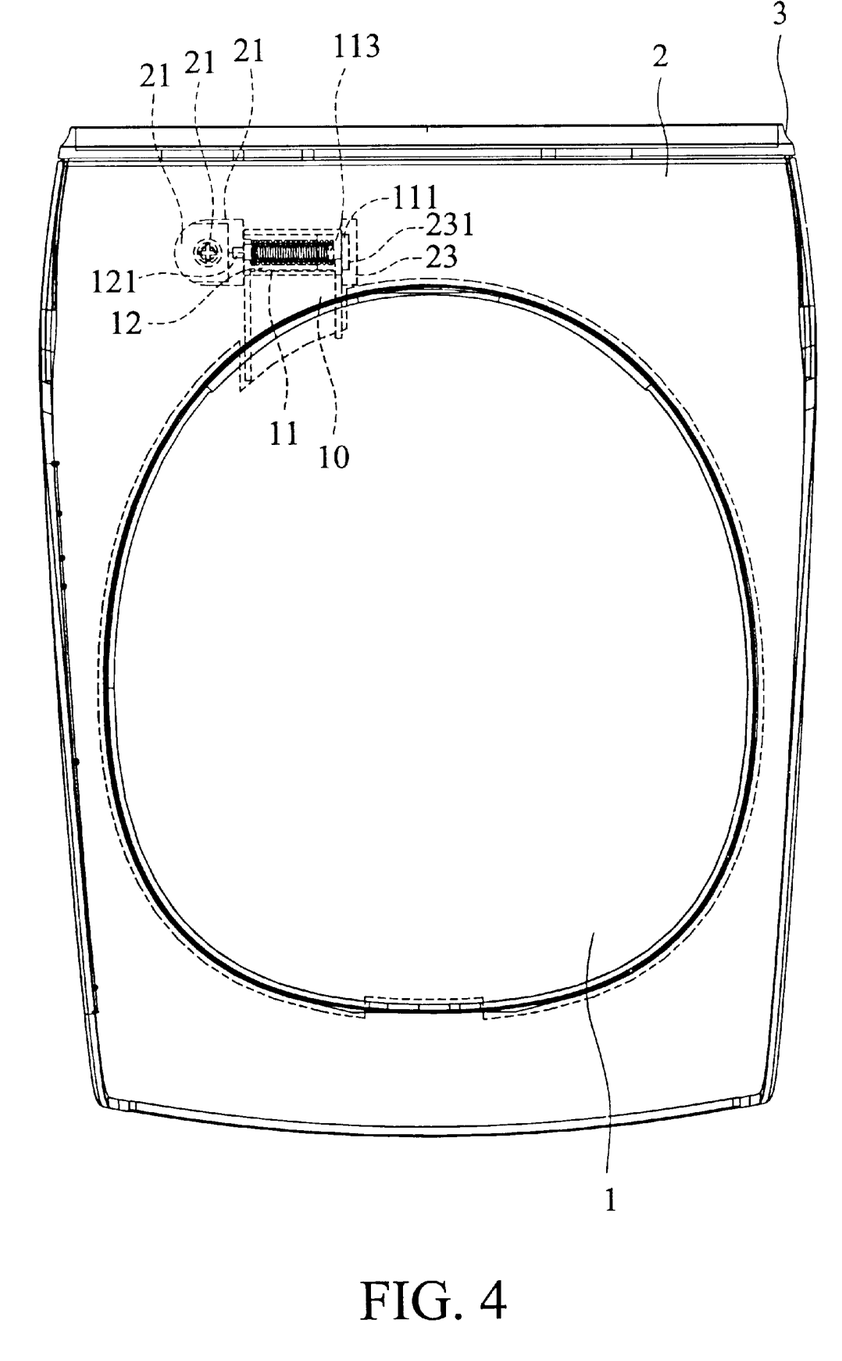
FIG. 4 is a top view of the opening cover disc drive.
Figure 5:
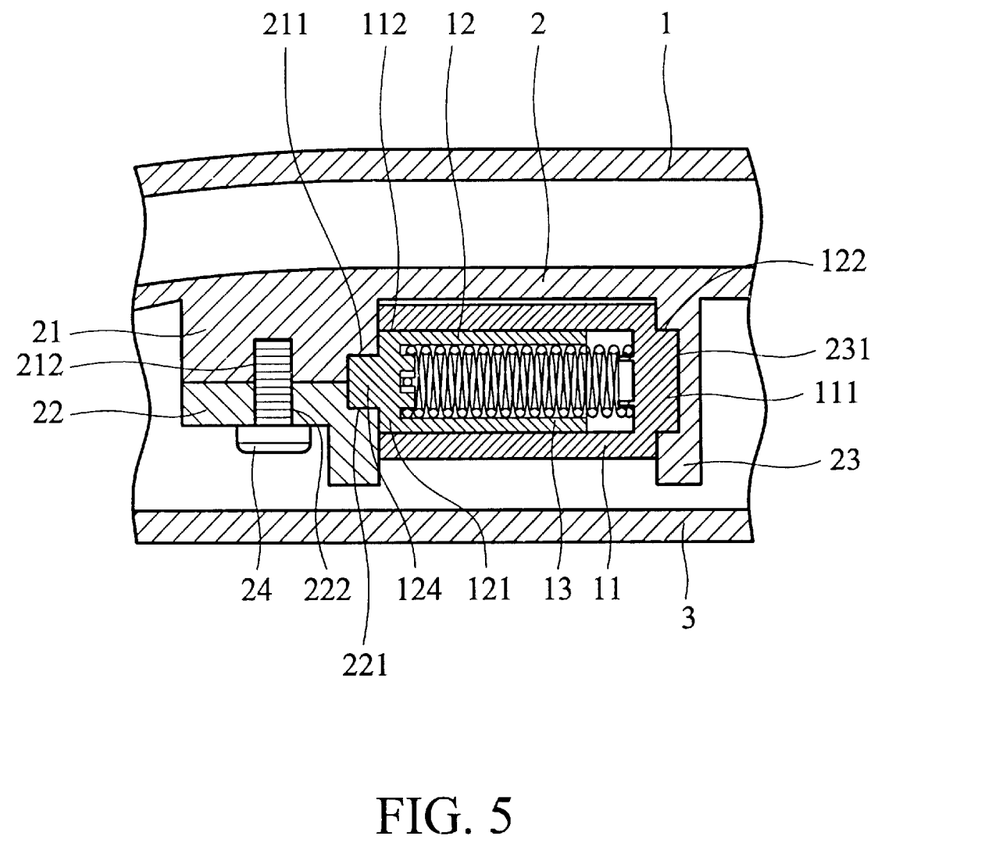
FIG. 5 is a cross-section of the rotating device of the present invention.
Figure 6:
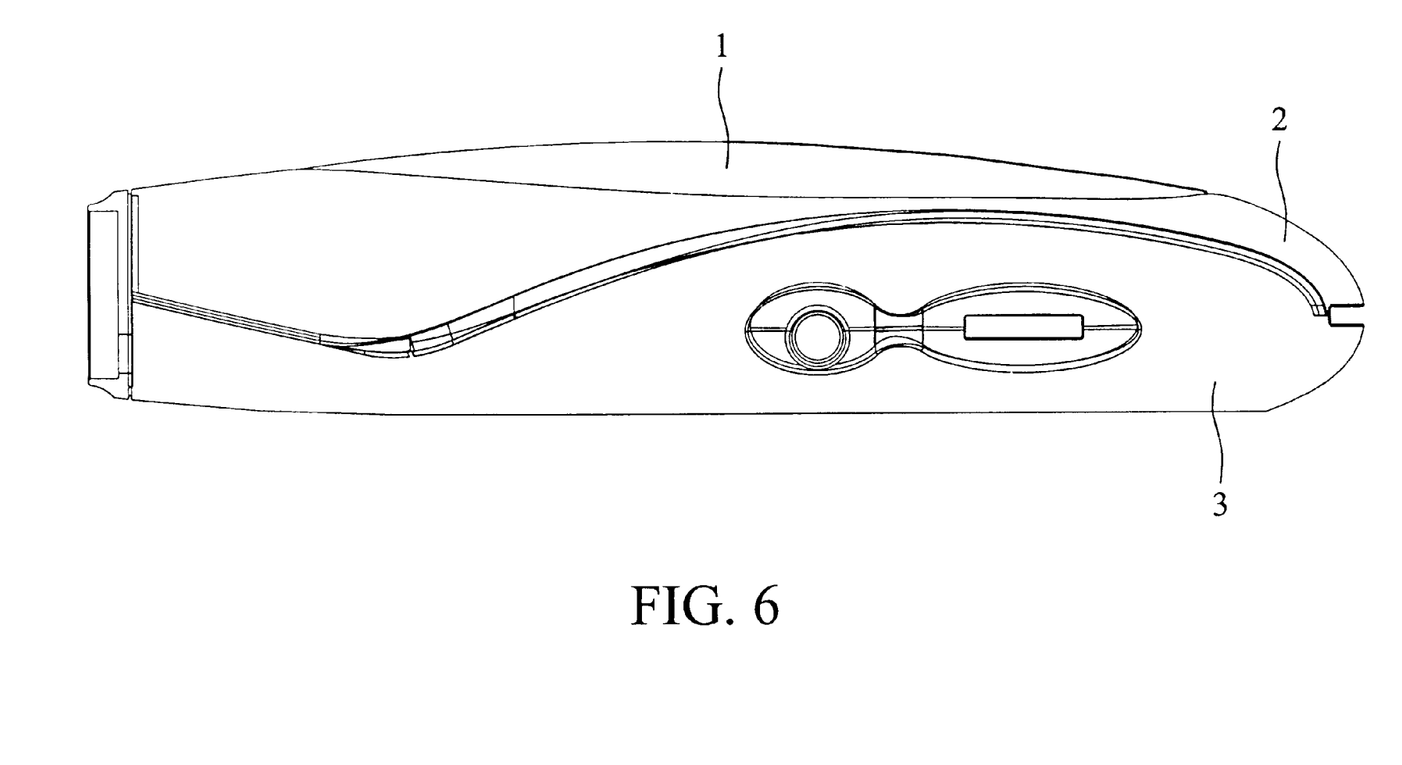
FIG. 6 is a side view of the opening cover disc drive.

The first housing (2) has a fixing place including a first end portion (23) and a second end portion. The first end portion (23) has a circular hollow (231) to pivot the first closed end (111) of the spring-loaded outer sleeve (11). The second end portion is constructed of an upper L-shaped member (21) and a lower L-shaped member (22). The upper L-shaped member (21) has an upper slot (211) and is fixed to the first housing (2). The lower L-shaped member (22) has a lower slot (221) and is bolted to the upper L-shaped member (21).

When fabricating the cover (1) and the first housing (2), the first closed end (121) of the spring-loaded outer sleeve (12) is disposed into the hollow (231) of the first end portion (23). The spring-loaded inner sleeve (12) is screwed so that the spring (13) provides proper elastic force. Moreover, the key (124) of the second closed end (121) of the spring-loaded inner sleeve (12) is inserted into the upper slot (211) of the upper L-shaped member (21) and the lower slot (221) of the lower L-shaped member (22) is aligned to the key (124). Finally, the lower L-shaped member (21) is bolted to the upper L-shaped member (21) by a screw (24) through the lower screw hole (222) and upper screw hole (212) so that the upper slot (211) of the upper L-shaped member (21) and the lower slot (221) of the lower L-shaped member (22) mesh the key (124).

Figure 7:
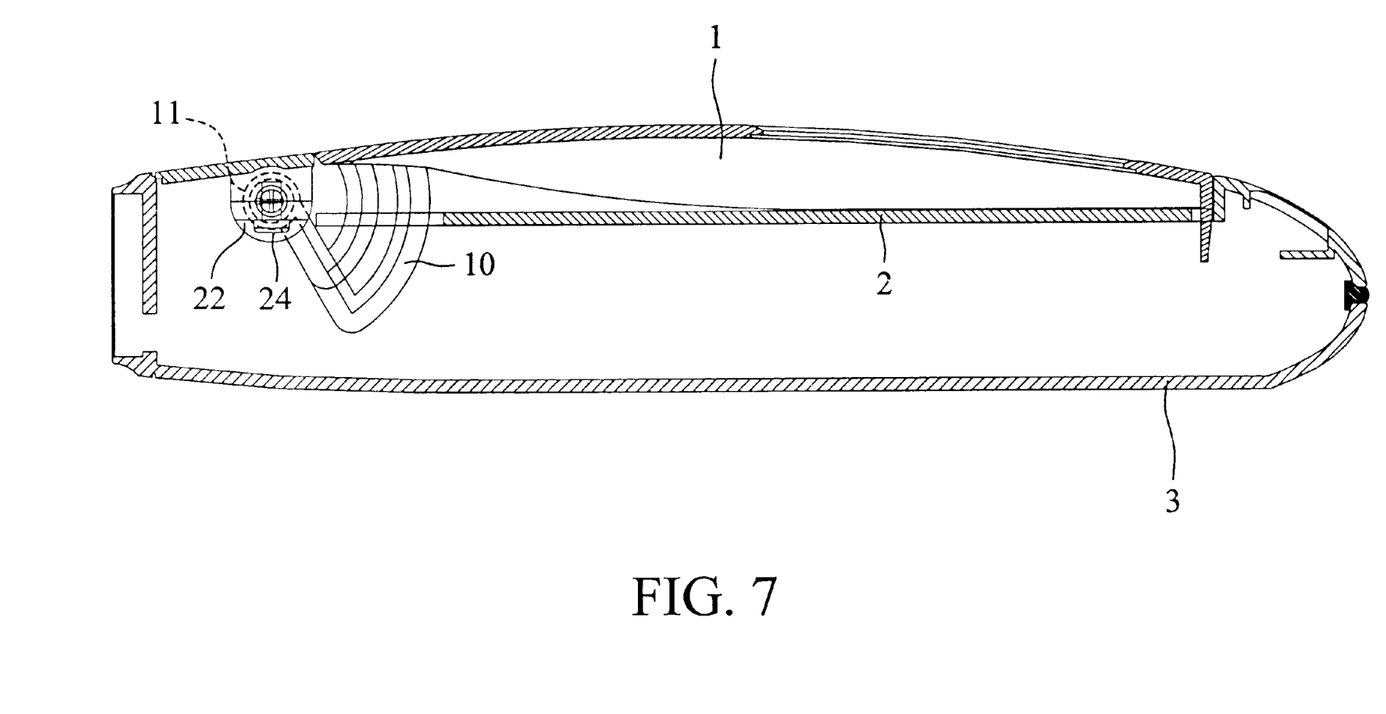
FIG. 7 is a cross-section of the opening cover disc drive with the cover closed.
Figure 8:
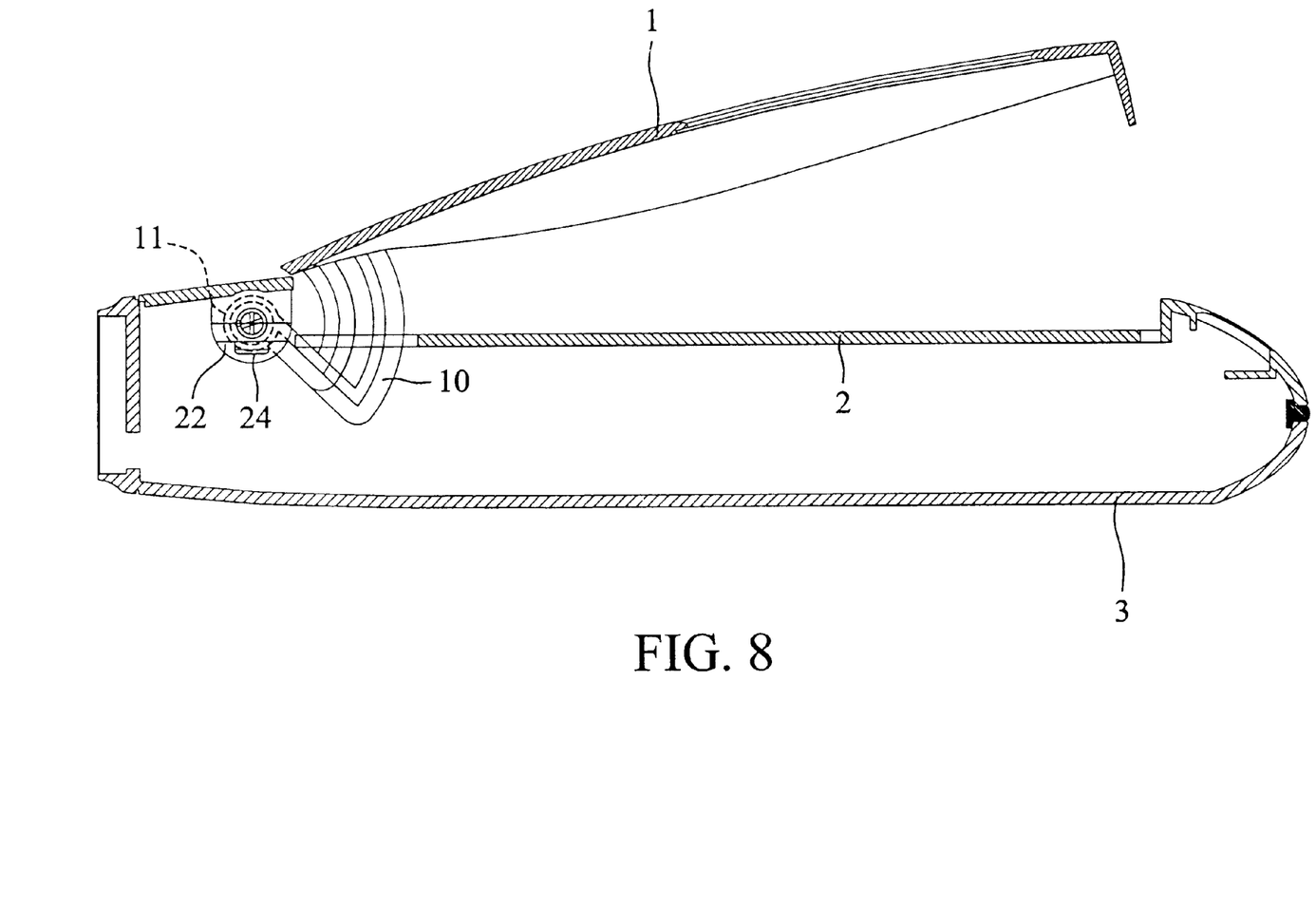
FIG. 8 is a cross-section of the opening cover disc drive with the cover opened.

When closing or opening the cover (1), the spring-loaded outer sleeve (11) moves with the cover (1), but the spring-loaded inner sleeve (12) stays still. The damping oil or gas damps the opening speed of the cover (1) to avoid breaking the spring-loaded outer sleeve (11) and the v-shaped member (10). The elastic force from the spring (13) opens the cover (1) and the cover is closed manually.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A rotating device for a cover connected to a housing of a disc drive, comprising:

a spring-loaded outer sleeve, fixed to the cover and having a first closed end and a first open end;

a spring-loaded inner sleeve, having a second closed end with a key and a second open end inserted into the first open end of the spring-loaded outer sleeve;

a spring, inserted into the spring-loaded inner sleeve and disposed between the spring-loaded outer sleeve and the spring-loaded inner sleeve; and a fixing place, fixed to the housing of the disc drive and including a first end portion with a hollow to pivot the first closed end of the spring-loaded outer sleeve and a second end portion with a key slot to mesh with the key of the spring-loaded inner sleeve.

2. The rotating device as claimed in claim 1, wherein the second end portion is constructed of an upper L-shaped member and a lower L-shaped member, the upper L-shaped member having an upper slot and fixed to the fixing place, the lower L-shaped member having a lower slot and fixed to the upper L-shaped member, and the upper slot and the lower slot forming the key slot.

3. The rotating device as claimed in claim 2, wherein the lower L-shaped member is bolted to the upper L-shaped member.

4. The rotating device as claimed in claim 1, wherein the first end portion of the fixing place and the housing of the disc drive are integral.

5. The rotating device as claimed in claim 1, wherein the spring-loaded outer sleeve is filled with damping material.

6. The rotating device as claimed in claim 5, wherein the damping material is damping oil.

7. The rotating device as claimed in claim 5, wherein the damping material is damping gas.

* * * * *